(12) United States Patent
Chainey

(10) Patent No.: US 9,127,872 B1
(45) Date of Patent: Sep. 8, 2015

(54) MOBILE STORAGE UNITS FOR DELIVERY

(71) Applicant: Amazon Technologies, Inc., Reno, NV (US)

(72) Inventor: James Andrew Chainey, Brentwood, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 164 days.

(21) Appl. No.: 14/036,978

(22) Filed: Sep. 25, 2013

(51) Int. Cl.
*F25D 11/00* (2006.01)
*B60P 7/13* (2006.01)
*E04B 1/343* (2006.01)

(52) U.S. Cl.
CPC ............... *F25D 11/003* (2013.01); *B60P 7/13* (2013.01); *E04B 1/34336* (2013.01)

(58) Field of Classification Search
CPC ...... F25D 11/003; E04B 1/34336; B60P 7/13
USPC ........ 62/239, 259.1, 340, 378, 440; 165/80.3, 165/67
See application file for complete search history.

(56) References Cited

U.S. PATENT DOCUMENTS

| | | | | |
|---|---|---|---|---|
| 4,009,792 A * | 3/1977 | Sano et al. | ...................... | 414/512 |
| 5,065,587 A * | 11/1991 | Howland et al. | ................. | 62/131 |
| 5,070,661 A * | 12/1991 | Lo Guidici | ...................... | 52/79.1 |
| 5,108,271 A * | 4/1992 | Berges et al. | ............... | 417/410.3 |
| 5,161,848 A * | 11/1992 | Lutton | ....................... | 296/181.6 |
| 5,704,676 A * | 1/1998 | Hill | .............................. | 296/24.35 |
| 5,967,740 A * | 10/1999 | Pflueger et al. | ............. | 414/749.6 |
| 6,003,919 A * | 12/1999 | Shook | .......................... | 296/26.14 |
| 6,012,384 A * | 1/2000 | Badalament et al. | ........... | 99/475 |
| 6,328,525 B1* | 12/2001 | Greenlaw et al. | .............. | 414/812 |
| 6,471,309 B1* | 10/2002 | Turner | ........................... | 312/201 |
| 7,082,685 B2* | 8/2006 | Crean | ........................... | 29/897.2 |
| 7,873,542 B2* | 1/2011 | Strohfus et al. | ................. | 705/22 |
| 8,523,508 B2* | 9/2013 | Hurler | ........................... | 414/545 |
| 8,561,564 B2* | 10/2013 | Brenner et al. | ................. | 114/238 |
| 2003/0123965 A1* | 7/2003 | Brackmann et al. | ........... | 414/467 |
| 2005/0036847 A1* | 2/2005 | Brackmann et al. | .............. | 410/2 |
| 2005/0241384 A1* | 11/2005 | Stephens et al. | ................. | 73/167 |
| 2007/0289976 A1* | 12/2007 | Meyer et al. | .............. | 220/592.09 |
| 2009/0260302 A1* | 10/2009 | Graf | ................................ | 52/79.5 |
| 2010/0107517 A1* | 5/2010 | Smith | ........................... | 52/127.2 |
| 2010/0107661 A1* | 5/2010 | Awwad et al. | ...................... | 62/80 |
| 2011/0164953 A1* | 7/2011 | Williams | ........................ | 414/572 |

\* cited by examiner

*Primary Examiner* — Mohammad M Ali
(74) *Attorney, Agent, or Firm* — Thomas | Horstemeyer, LLP

(57) ABSTRACT

Disclosed are various embodiments for mobile storage unit. The mobile storage unit includes a plurality of walls forming an interior region to store a plurality of items. The mobile storage unit also includes a base supporting the plurality of walls. The mobile storage unit includes a locking device coupled to the base, the locking being configured to engage a receiving locking device, the receiving locking device being coupled to a payload platform of a delivery vehicle.

24 Claims, 6 Drawing Sheets

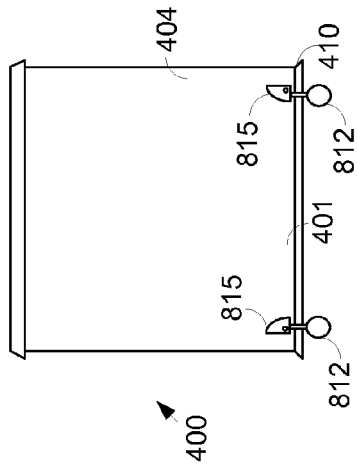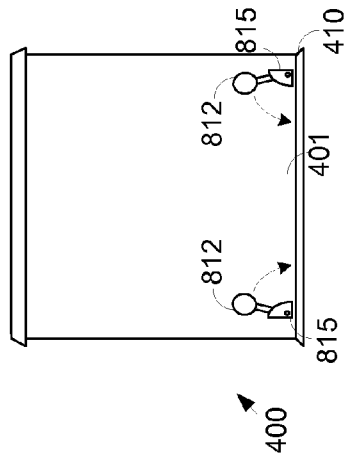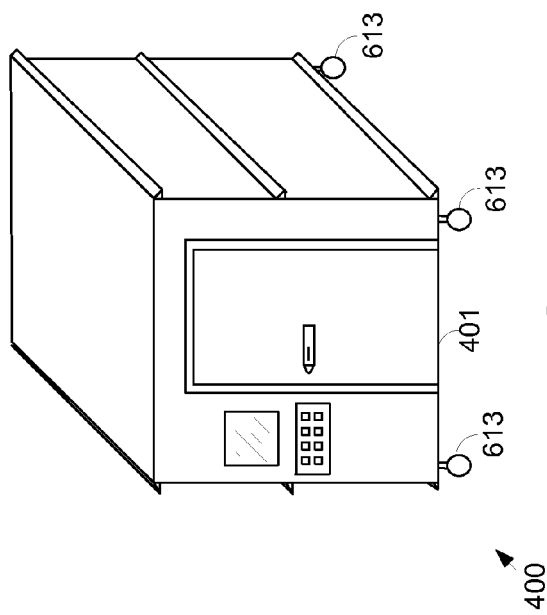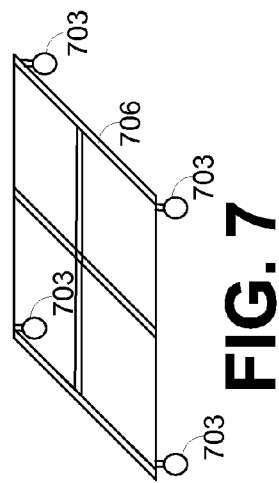

MOBILE STORAGE UNITS FOR DELIVERY

BACKGROUND

Customers residing in various geographic regions order items to be shipped to a customer site of choice. A fleet of delivery vehicles may service these geographic regions. A delivery vehicle may make numerous trips between a depot and to the customer sites specified by a delivery route. A delivery vehicle may be loaded with items for delivery before beginning each trip. After the deliveries are made to one or more customer sites, the delivery truck may return to the depot to be loaded with additional items before beginning another trip.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

FIG. 6 is a drawing of an example of the mobile storage unit of FIG. 4 according to various embodiments of the present disclosure.

FIG. 7 is a drawing of an example of a set of detachable wheels that are configured to be attached to the mobile storage unit of FIG. 4 according to various embodiments of the present disclosure.

FIG. 8A is a drawing of an example of retractable wheels of the mobile storage unit of FIG. 4 according to various embodiments of the present disclosure.

FIG. 8B is a drawing of an example of retractable wheels of the mobile storage unit of FIG. 4 according to various embodiments of the present disclosure.

DETAILED DESCRIPTION

The present disclosure relates to a mobile storage unit that is decoupled from the delivery truck or trailer. By decoupling the storage from the delivery truck, the sortation and loading of delivery items may be made while the delivery truck or trailer is remotely located. Thus, the delivery vehicle may make deliveries while the mobile storage unit is being loaded with items for the next trip of the delivery vehicle. Additionally, some delivery items may require refrigeration. The mobile storage units may function as refrigerators or freezers. This allows for rapidly scaling a delivery fleet with a combination of mobile storage units, some of which may provide refrigeration.

According to various embodiments, a payload platform of a delivery vehicle may be configured to receive multiple mobile storage units. This allows for multiple storage units to be loaded with delivery items at separate locations within a materials handling facility. In some embodiments, the mobile storage units may include a set of wheels to facilitate efficient transportation throughout a large warehouse of items scheduled for delivery. The payload platform of a truck or trailer may receive a combination of refrigerated mobile storage units and non-refrigerated storage units. By allowing the delivery vehicle to include refrigerated and non-refrigerated items, delivery route optimization may occur.

Moreover, some embodiments of the present disclosure relate to including a display monitor and computing device in a mobile storage unit. In this case, a mobile storage unit may track those items stored in the mobile storage unit and provide information to delivery vehicle operators via a display monitor. This information may include delivery information such as delivery route information, mobile unit storage temperature, or any other information relating to the delivery of items. In the following discussion, a general description of the system and its components is provided, followed by a discussion of the operation of the same.

Figure 1:
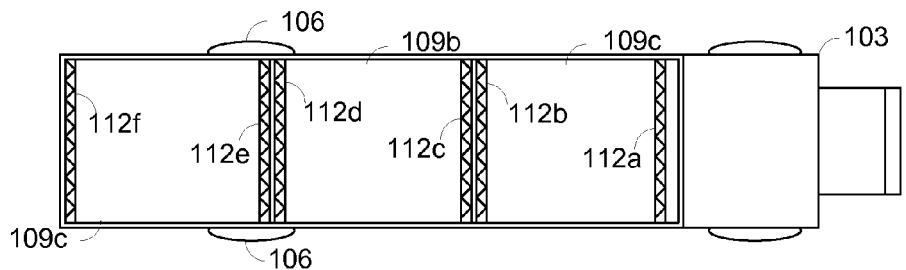
FIG. 1 is a drawing of an example of a top down view of a payload platform of a motorized vehicle according to various embodiments of the present disclosure.

With reference to FIG. 1, shown is a non-limiting example of a top view of a payload platform 100 of a motorized vehicle, such as a truck, according to various embodiments of the present disclosure. The payload platform 100 may be mounted or permanently attached to the cabin of a motorized vehicle such as, for example, a delivery truck. In this respect, the payload platform 100 may form a flat bed or flat surface that extends from a delivery vehicle cabin.

In other embodiments, the payload platform 100 may be a trailer that is configured to be towed by a motorized vehicle. In this case, the payload platform 100 is attached to a vehicle cabin 103 that comprises a motor to move the payload platform 100. The payload platform 100 may be supported by one or more wheels 106. The payload platform 100 may include one or more support areas 109a,b,c. The non-limiting example of FIG. 1 depicts three support areas 109a,b,c made up of a first support area 109a, a second support area 109b, and a third support area 109c. Although FIG. 1 depicts three support areas 109a,b,c, the payload platform 100 may be configured with any number of support areas 109a,b,c. A support area 109a,b,c may form a horizontal surface that is configured for the placement of a mobile storage unit, as is discussed below with respect to at least FIG. 9. According to an embodiment, the payload platform 100 is a relatively flat region that is configured to support a loading of a mobile storage unit.

According to various embodiments, the payload platform 100 includes one or more receiving guiderails 112a-f to allow a mobile storage unit to slide into a position defined by the placement of the receiving guiderail 112a-f. A guiderail may include a channel formed by a pair of opposing walls or opposing fins. The receiving guiderail 112a-f functions as an extended receptacle that receives a component by forcing the component to slide along the axis of the receiving guiderail 112*a-f*. As shown in the non-limiting example of FIG. 1, the receiving guiderail 112*a-f* may be aligned in a parallel manner with respect to one another. The receiving guiderail 112*a-f* may be used in conjunction with a receiving locking device such as a lever, pin, latch, magnet, clip, hook, buckle, or any other fastener that is configured to receive a corresponding component that is attached to the mobile storage unit and lock the corresponding component into place. The receiving locking device may be attached to the receiving guiderail 112*a-f* or attached to a support area 109*a-c*. The receiving locking device may be a manual lock used to fasten the load by hand. The receiving locking device may also be electronically controlled such that the locking mechanism of the receiving locking device is automatically actuated in response to receiving a remote electronic communication signal.

In some embodiments, the receiving guiderails 112*a-f* include one or more wheels or bearings disposed in the channel formed by the receiving guiderail 112*a-f*. The wheels or bearings facilitate linear motion for any load placed in contact with the wheels or bearings.

A receiving guiderail 112*a-f* may be disposed, mounted, attached, or otherwise fastened to a respective support area 109*a,b,c*. For example, a first support area 109*a* may include a first receiving guardrail 112*a* and a second receiving guardrail 112*b*. The second support area 109*b* may include a third receiving guardrail 112*c* and a fourth receiving guardrail 112*d*. A third support area 109*c* may include a fifth receiving guardrail 112*e* and a sixth receiving guardrail 112*f*.

Figure 2:
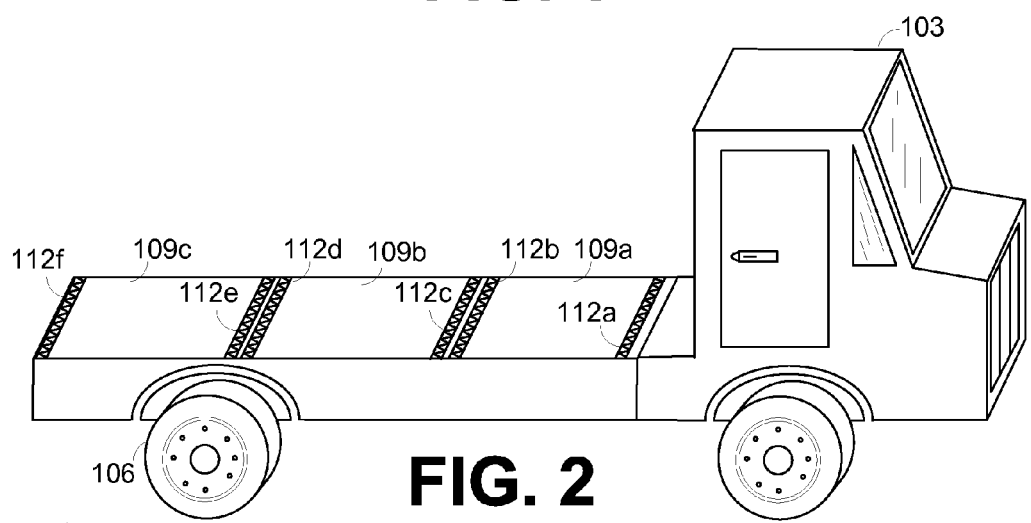
FIG. 2 is a drawing of an example of a side view of the payload platform of FIG. 1 according to various embodiments of the present disclosure.

With reference to FIG. 2, shown is a side view of the payload platform 100 of a motorized vehicle according to various embodiments of the present disclosure. If the payload platform 100 is a trailer, then the payload platform may include a trailer hitch. The payload platform 100 is supported by one or more wheels 106 to allow the payload platform 100 to follow the motorized vehicle while the motorized vehicle is in motion. The payload platform 100 includes one or more support areas 109*a,b,c*. Additionally, the payload platform 100 may further include one or more receiving guiderails 112*a-f*. The support areas 109*a,b,c*, may be defined by the placement of the receiving guiderails 112*a-f*. For example, a set of receiving guiderails 112*a-f* may straddle a corresponding support area 109*a,b,c*. For example, the first receiving guiderail 112*a* and the second receiving guiderail 112*b* form the outer boundary of the first support area 109*a*.

Figure 3:
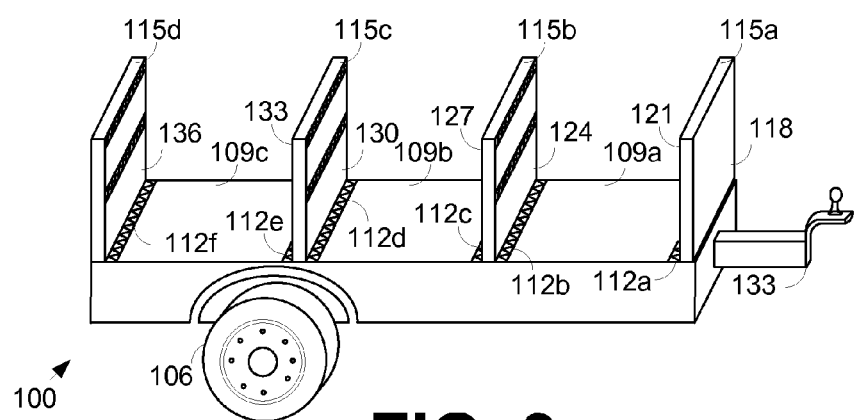
FIG. 3 is another drawing of a side view of a payload platform with a frame structure according to various embodiments of the present disclosure.

With reference to FIG. 3, shown is a side view of a payload platform 100 with a frame structure 115*a-d* according to various embodiments of the present disclosure. The frame structure 115*a-d* may comprise multiple posts, risers, dividers columns, vertical panels, walls, or any other structure that is relatively vertical with respect to the surface formed by the support areas 109*a,b,c*. In the non-limiting example of FIG. 3, the first support area 109*a* is surrounded by a first frame structure member 115*a* and a second frame structure member 115*b*. A mobile storage unit may be inserted between or within the first frame structure member 115*a* and a second frame structure member 115*b* such that the mobile storage unit is supported by the first support area 109*a*. Moreover, the receiving guiderails 112*a,b* of the first support area 109*a* may be configured to guide the mobile storage unit to glide along the axes of the receiving guiderails 112*a,b* and lock into place.

The second support area 109*b* is formed as a region between the second frame structure member 115*b* and the third frame structure member 115*c*. The third support area 109*c* is formed as a region between the third frame structure member 115*c* and the fourth frame structure member 115*d*.

Thus, the payload platform 100 may support up to three mobile storage units. Although the non-limiting example of FIG. 3 depicts three support areas 109*a,b,c*, any number of support areas may be employed by the payload platform 100. In this respect, the number of support frame members may increase or decrease depending on the number of support areas.

According to various embodiments, each frame structure member 115*a-d* may include side receiving guiderails. For example, the first frame structure member 115*a* may comprise a front surface 118 and a back surface 121. The back surface may be coupled to one or more side receiving guiderails because the back surface of the first frame structure member 115*a* is configured to secure a portion of the mobile storage unit. The second frame structure member 115*b* may comprise a front surface 124 that is coupled to one or more side receiving guiderails. Accordingly, the front surface 124 of the second frame structure member 115*b* and the back surface 121 of the first frame structure member 115*a* are configured to secure a mobile storage unit.

Another mobile storage unit may be inserted between the back surface 127 of the second frame structure member 115*b* and of the front surface 130 of the third frame structure member 115*c*. Moreover, another mobile storage unit may be inserted between the back surface 133 of the third frame structure member 115*c* and of the front surface 136 of the fourth frame structure member 115*d*.

By coupling a side guiderail to a front surface 124, 130, 136 or a back surface 121, 127, 133, the receiving guiderails 112*a-f* may be referred to as bottom receiving guiderails 112*a-f* such that the bottom receiving guiderails 112*a-f* engage a bottom portion of the mobile storage unit. The side receiving guiderails may engage side guiderails of the mobile storage units, as is discussed in further detail with respect to FIG. 9.

Figure 4:
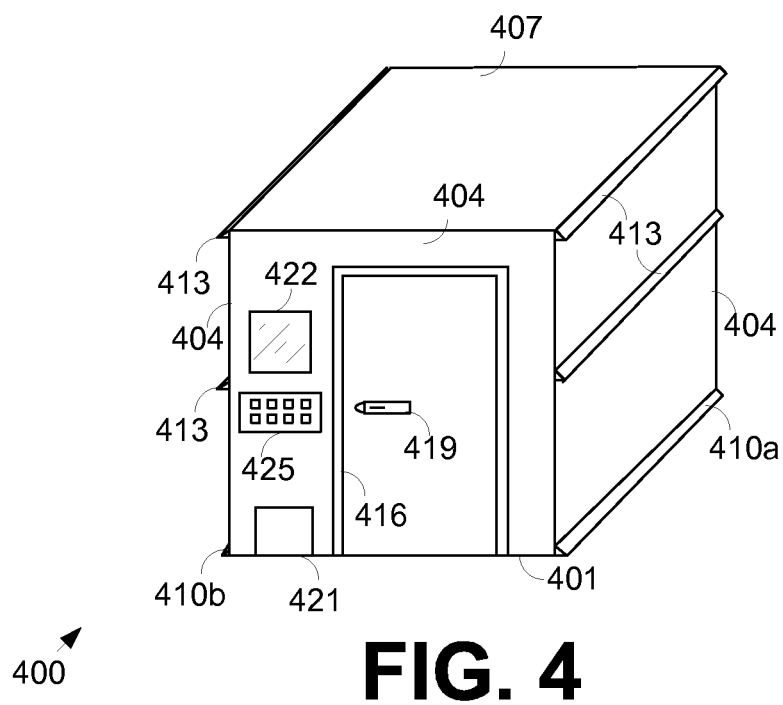
FIG. 4 is a drawing of an example of a mobile storage unit according to various embodiments of the present disclosure.

With reference to FIG. 4, shown is an example of a mobile storage unit 400 according to various embodiments of the present disclosure. The mobile storage unit 400 may be a mobile bay or crate that is used to store items, whether those items are in transit or not in transit. The mobile storage unit 400 may be used in a materials handling facility that stores items to be delivered to various customers at varying locations. A materials handling facility may be a fulfillment center, a warehouse, a storage facility, a shipping facility, or any other structure designed to house multiple items. The materials handling facility may be a "last mile" depot such that the last mile depot is the last destination of the items before the items are delivered to end points such as, for example, customer sites. Thus, items are shipped to or stored in the last mile depot before the final leg of the delivery of the items to the customers.

The mobile storage unit 400 may comprise a base 401 that supports multiple walls 404. A ceiling 407 may be supported by the walls 404 to protect items stored within the mobile storage unit 400. The mobile storage unit 400 may include one or more bottom guiderails 410*a,b* that are coupled to the base 401. The bottom guiderails 410*a,b*, may be configured to engage the receiving guiderails 112*a-f* (FIGS. 1-3).

The mobile storage unit 400 may also comprise one or more side guiderails 413 that are coupled to the exterior of one or more walls 404. The side guiderails 413 may be configured to engage the receiving side guiderails attached to the front surfaces 124, 130, 136 or back surfaces 121, 127, 133 of FIG. 3.

The mobile storage unit 400 comprises a doorway 416 that functions as a portal to allow access to the interior of the mobile storage unit 400. The doorway 416 may comprise a door that includes a door opening device 419 such as, for example, a latch, a door knob or a door handle. The doorway 416 includes a frame that extends along a plane that is perpendicular to a plane formed by the bottom guiderails 410*a*,*b*. The frame defines the boundaries of the portal that allows access to the interior region of the mobile storage unit 400.

The mobile storage unit 400 may be configured to refrigerate or freeze items stored in the mobile storage unit 400. In this case, the mobile storage unit 400 comprises a refrigeration system to reduce the temperature to fall below a predefined temperature such as 45 degrees Fahrenheit. The refrigeration system may include a thermally insulated compartment for storing items and a heat pump such as a compressor. The refrigeration system may include a temperature controller for setting and controlling the temperature of the mobile storage unit 400. In addition, the mobile storage unit 400 may include a power supply such as, for example, one or more battery systems, a generator, or any power supply that is suitable to power the refrigeration system of the mobile storage unit 400. The mobile storage unit 400 may alternatively or additionally include a plug or receptacle that couples to a power source of a remote source. For example, the mobile storage unit 400 may include a power inlet that receives a power supply voltage originating from a remote source such as, for example, a power supply of the delivery vehicle. Thus, the mobile storage unit 400 may receive power upon loading the mobile storage unit 400 onto a payload platform 100. The power supply may be used to power various components of the mobile storage unit 400.

In other embodiments, the mobile storage unit 400 includes a port for receiving air that has been cooled by a remote refrigeration system. The port is configured to be coupled to a duct that facilitates air flow originating from the remote refrigeration system to the mobile storage unit 400. In this respect, items stored in the mobile storage unit 400 may be refrigerated without the use of the mobile storage unit's 400 refrigeration system. The remote refrigeration system may be part of the motorized vehicle. The remote refrigeration system may direct cooled air via a system of ducts to one or more mobile storage units 400 loaded onto the payload platform 100.

According to various embodiments, the mobile storage unit 400 includes a computing device 421. The computing device 421 may be in data communication with a display monitor 422. The display monitor 422 may comprise, for example, one or more devices such as liquid crystal display (LCD) displays, gas plasma-based flat panel displays, organic light emitting diode (OLED) displays, LCD projectors, or other types of display devices, etc. The display monitor 422 may be mounted to an outer surface of the wall 404 to allow users to obtain information presented on the display monitor 422. The display monitor 422 may be configured to display delivery route information, temperature information, or other information, as is discussed in detail below with respect to at least FIG. 10. The computing device 421, display monitor 422, refrigeration system, or any other component may be powered by a power supply built into the mobile storage unit 400 or from a power supply voltage received by a power inlet of the mobile storage unit 400, where the power supply voltage is generated from a remote power supply.

The mobile storage unit 400 may further include an input device 425 such as, for example, a keypad, a touch pad, a mouse, a joystick, or any other input device. The input device 425 may provide control and manipulation of various menus presented on the display monitor 422. For example, the input device 425 may comprise controls to set the temperature of the mobile storage unit 400 that includes a refrigerator apparatus such as, a refrigeration system or a connection to a refrigeration system via a port. In some embodiments, the display monitor 422 is a touch screen such that an input device 425 is not necessary.

In some embodiments, the mobile storage unit 400 includes an identification system that communicates with an external computing system. The identification system may comprise a transmitter. The transmitter may be a wired transmitter such that the mobile storage unit 400 includes a data port used to send electronic communication to the external computing system over a wired network connection. The wired network connection may be implemented using a Universal Serial Bus (USB), Ethernet, or any other wired network. In other embodiments, the transmitter is a wireless transmitter that wirelessly communicates with the external computing system over a network such as, for example, Wi-Fi, Bluetooth, ZigBee, RFID, or any other wireless network. The transmitter may transmit a unique identifier associated with mobile storage unit 400 to the external computing system. In other embodiments, the identification system may include a Quick Response (QR), barcode, or any other optical identifier that communicates the mobile storage unit's 400 unique identifier to the external computing system.

The external computing system may comprise, for example, a server computer or any other system providing computing capability. Alternatively, the external computing system may employ a plurality of computing devices that may be arranged in one or more server banks or computer banks or other arrangements. Such computing devices may be located in a single installation or may be distributed among many different geographical locations. For example, the external computing system may include a plurality of computing devices that together may comprise a grid computing resource, and/or any other distributed computing arrangement. In some cases, the external computing system may correspond to an elastic computing resource where the allotted capacity of processing, network, storage, or other computing-related resources may vary over time.

The external computing system may map items to corresponding mobile storage units 400. For example, the external computing system may maintain a listing of the mobile storage units 400 and identify which items are actually stored in the mobile storage units 400 or which items are scheduled to be loaded in the appropriate mobile storage units 400. Delivery route information for a particular mobile storage unit 400 may be associated with the unique identifier for the particular mobile storage unit 400.

Figure 5:
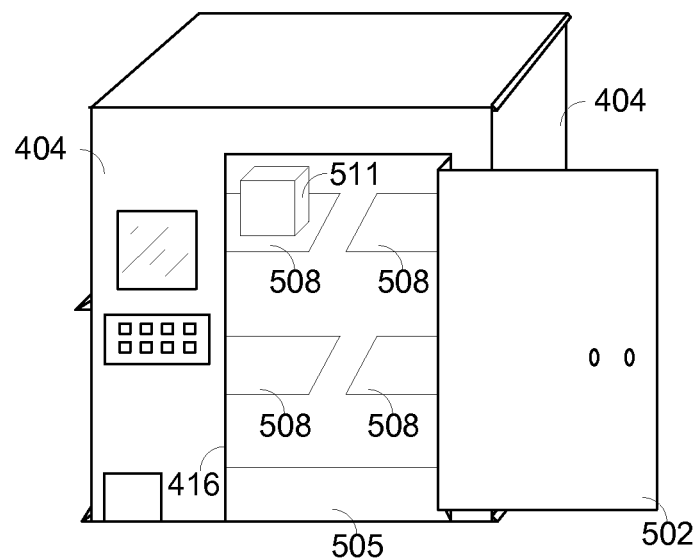
FIG. 5 is a drawing of an example of the mobile storage unit of FIG. 4 according to various embodiments of the present disclosure.

With reference to FIG. 5, shown is a drawing of an example of the mobile storage unit 400 of FIG. 4 according to various embodiments of the present disclosure. The mobile storage unit 400 depicts a doorway 416 with a door 502 in an open position. The doorway 416 is a portal that provides access to an interior region 505 that is formed by the walls 404 of the mobile storage unit 400. One or more compartments 508 may be located within the interior region. A compartment may comprise, for example, a bin, slot, shelf, container, receptacle, crate, stall, crib, or any other storage device that is located inside the mobile storage unit 400. The compartments may store one or more items 511 for delivery. Items 511 may be packaged and loaded into the mobile storage unit 400 for delivery.

According to some embodiments, the door 502 comprises a roller door. The roller door may include one or more preloaded springs inside a roller mechanism to reduce the amount of external force required to roll the door into the open position or closed position. The roller door may comprise a plurality of panels hinged together to allow the roller door to roll upwards, downwards, or sideways. The door 502 may alternatively comprise a sliding door that may slide vertically or horizontally. The sliding door may be a single panel that translates along the plane formed by the doorway 416.

With reference to FIG. 6, shown is an example of the mobile storage unit 400 of FIG. 4 according to various embodiments of the present disclosure. Specifically, FIG. 6 depicts one or more embodiments of a mobile storage unit 400 that comprises a set of wheels 613. The wheels may be attached to the base of the mobile storage unit 400 to facilitate an efficient relocation of the mobile storage unit 400 throughout a facility such as, for example, a materials handling facility that stores multiple items 511 (FIG. 5) for delivery. The mobile storage unit 400 may be wheeled throughout the facility in order to load the mobile storage unit 400 with items 511. In this respect, items stored in a warehouse may easily be loaded into the mobile storage unit 400.

In the case where the mobile storage unit 400 comprises a refrigerator that stores refrigerated items, the mobile storage unit 400 may be stored in a refrigerated section of the depot. In this respect, the power supply of the mobile storage unit 400 does not need to operate because the external environment of the mobile storage unit 400 is a refrigerated environment. When the mobile storage unit 400 is ready for delivery, the mobile storage unit 400 may be wheeled to the delivery vehicle.

With reference to FIG. 7, shown is an example of a set of detachable wheels 703 that are configured to be attached to the mobile storage unit 400 of FIG. 4 according to various embodiments of the present disclosure. The set of detachable wheels may be coupled to a wheel frame 706. The wheel frame 706 may be removably coupled to the base 401 (FIG. 4) of the mobile storage unit 400. For example, the wheel frame 706 may attach to the base 401 by clipping onto the base 401 or the base 401 may simply rest on the wheel frame 706.

In some embodiments, the wheel frame 706 comprises one or more magnets or latches to lock into a position that attaches the wheel frame to the base 401. The wheel frame 706 along with the set of wheels 703 may be decoupled from the mobile storage unit 400 at the time of loading the mobile storage unit 400 onto a payload platform 100 (FIGS. 1-3). By removing the wheel frame 706, the mobile storage unit 400 may be securely fastened or attached to the payload platform 100.

With reference to FIG. 8A, shown is an example of retractable wheels 812 of the mobile storage unit 400 of FIG. 4 according to various embodiments of the present disclosure. Specifically, the non-limiting example of FIG. 8A depicts a first position of the retractable wheels 812 such that the retractable wheels 812 make contact with the ground surface while the retractable wheels 812 are in the first position. In this respect, the mobile storage unit 400 may be wheeled along the ground surface from one location to another.

Each retractable wheel 812 is coupled to a corresponding locking joint member 815. The locking joint member 815 may be coupled to the base 401 of the mobile storage unit 400. The wall 404 may extend above the locking joint member 815. The locking joint member 815 may allow a corresponding retractable wheel 812 to rotate about a pivot point and lock into the first position. The retractable wheels 812 may protrude away from the wall 404 and extend beyond the bottom guiderail 410 to avoid physical contact with the bottom guiderail.

With reference to FIG. 8B, shown is an example of retractable wheels 812 of the mobile storage unit 400 of FIG. 4 according to various embodiments of the present disclosure. Specifically, the non-limiting example of FIG. 8A depicts a second position of the retractable wheels 812 such that the retractable wheels 812 do not make contact with the ground surface while the retractable wheels 812 are in the second position. In this respect, the retractable wheels avoid contact with ground surface to allow the mobile storage unit 400 to be securely placed above the support area 109*a,b,c* (FIGS. 1-3) of a payload platform 100 (FIGS. 1-3) without contacting the support area 109*a,b,c*.

Each retractable wheel 812 is coupled to a corresponding locking joint member 815. The locking joint member 815 may be coupled to the base 401 of the mobile storage unit 400. The locking joint member 815 may allow a corresponding retractable wheel 812 to rotate upwards about a pivot point and lock into the first position. The retractable wheels 812 may retract towards the wall 404 such that the retractable wheels 812 do not extend beyond the bottom guiderail 410. For example, the locking joint member 815 may include a telescopic retractable structure that causes the retractable wheels 812 to not protrude beyond the bottom guiderail 410 while the retractable wheels are in the second position.

Figure 9:
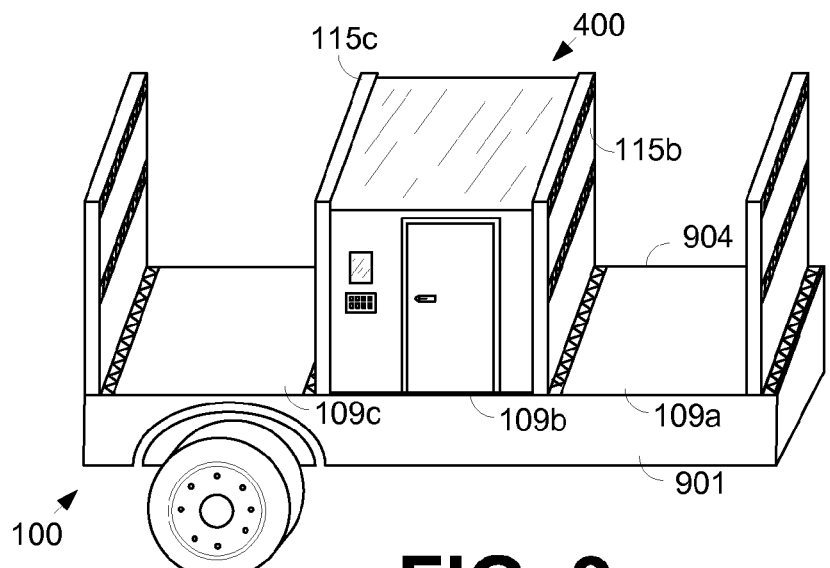
FIG. 9 is a drawing of an example of the payload platform of FIGS. 1-3 and the mobile storage unit of FIG. 4 according to various embodiments of the present disclosure.

With reference to FIG. 9, shown is an example of the payload platform 100 of FIGS. 1-3 and the mobile storage unit 400 of FIG. 4 according to various embodiments of the present disclosure. FIG. 9 depicts loading one mobile storage unit 400 onto the payload platform 100 of a delivery vehicle. The mobile storage unit is loaded such that it rests on the second support area 109*b*. Moreover, the mobile storage unit 400 is placed between a second frame structure member 115*b* and a third frame structure member 115*c*.

Other mobile storage units 400 may additionally be loaded onto the first support area 109*a* and/or the third support area 109*c*. The mobile storage unit 400 may be loaded from the right side 901 of the payload platform 100 or the left side 904 of the payload platform. For example, if loaded from the right side 901, a platform of the bottom guiderail 410*a,b*, (FIG. 4) engages a platform of the bottom receiving guiderail 112*c,d*. Thereafter, the mobile storage unit 400 may slide along the axis of the bottom receiving guiderail 112*c,d*, from the right side 901 to the left side 903 as the mobile storage unit 400 is guided along a channel of the bottom guiderails 112*,d*. Once placed on the payload platform 100, the mobile storage unit may lock into place using a locking device.

The locking device may be a lever, pin, latch, magnet, clip, hook, buckle, or any other fastener that is configured to engage the receiving locking device of the payload platform. The locking device may be a manual lock used to fasten the mobile storage unit 400 to the payload platform 100 by hand. The locking device may also be electronically controlled such that the locking mechanism of the locking device is automatically actuated in response to receiving a remote electronic communication signal.

Figure 10:
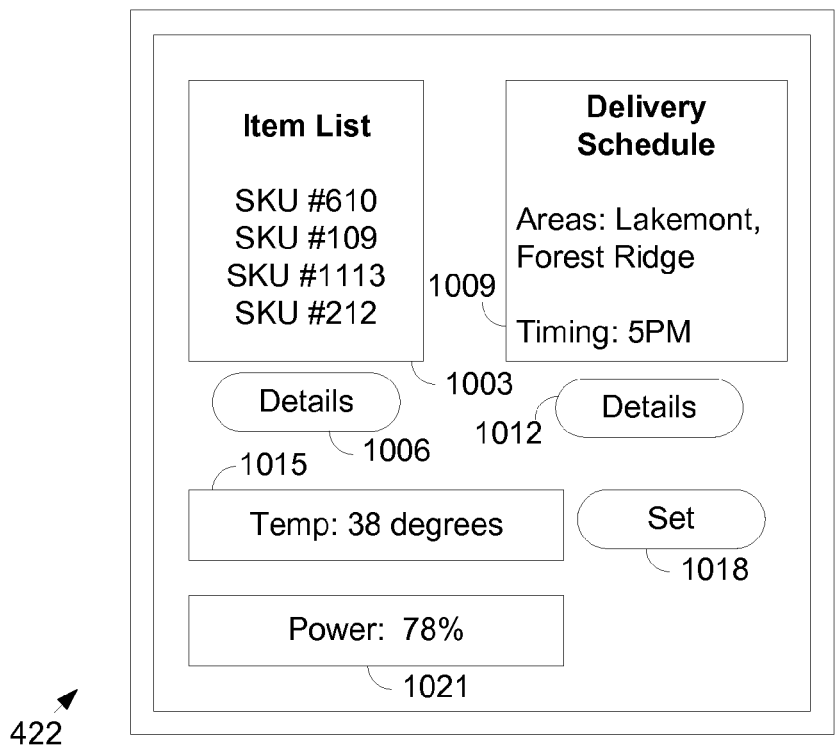
FIG. 10 is a drawing of an example of display monitor of the mobile storage unit of FIG. 4 according to various embodiments of the present disclosure.

With reference to FIG. 10, shown is an example of display monitor 422 of the mobile storage unit 400 of FIG. 4 according to various embodiments of the present disclosure. The display monitor 422 may display delivery route information such as, for example, an item listing 1003 of those items 511 (FIG. 5) that are actually stored or that are scheduled to be stored in the mobile storage unit 400. The item listing 1003 may comprise a listing of items 511 or any other item information such as, for example, the item name, item identifier, item weight, or delivery instructions for the item. A user may manipulate an input device 425 (FIG. 4) to select additional details 1006 or to scroll through the item listing 1003. According to various embodiments, the mobile storage unit 400 comprises a radio frequency identification (RFID) device that tracks the items 511 stored in the mobile storage unit 400.

For example, passive or active RFID tags may be used to track each item 511 loaded or removed from the mobile storage unit 400.

In addition, the display monitor 422 may display delivery route information such as a delivery schedule 1009. The delivery route schedule may specify the delivery locations of those items 511 contained in a particular mobile storage unit 400. To this end, when loading multiple mobile storage units 400 onto the payload platform 100 (FIGS. 1-3) of a single delivery vehicle, a delivery operator may ascertain the delivery locations associated with each mobile storage unit 400.

The user may manipulate an input device 425 to select additional details 1012 or to scroll through the delivery schedule 1009 information. The delivery schedule 1009 my also include route information, delivery time information, or any other delivery related information.

The display monitor 422 may present temperature information relating to the temperature of the interior region 505 (FIG. 5) of the mobile storage unit 400 where items 511 are stored. The user may manipulate an input device 425 to access a settings interface 1018 to control the temperature. For example, the temperature is controlled by controlling a refrigeration system that is responsible for cooling the interior region 505. Additionally, the compression may receive power via a power supply. Power supply information 1021 such as remaining power may be displayed on the display monitor 422.

According to various embodiments, the mobile storage unit 400 includes a computing device that communicates with a client device over a network. The network may be, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. The client device may be part of an external computing system. The client device may comprise, for example, a processor-based system such as a computer system. Such a computer system may be embodied in the form of a desktop computer, a laptop computer, personal digital assistants, cellular telephones, smartphones, web pads, tablet computer systems, or other devices with like capability.

Information such as, for example, the item listing 1003, the delivery schedule 1009, or any other delivery related information may be transmitted from a client to the computing device of the mobile storage unit 400. The computing device may comprise a processor based system and memory that is configured to store information.

The mobile storage unit 400 may track items 511 stored within the interior region 505 and communicate that information to the client device. In this respect, the client may download the information tracked by the mobile storage unit 400. Alternatively, an external computing system may track the items 511 stored in the mobile storage unit 400. The mobile storage unit 400 may be identified by the external computing system by obtaining a unique identifier that is transmitted from the mobile storage unit 400.

Figure 11A:
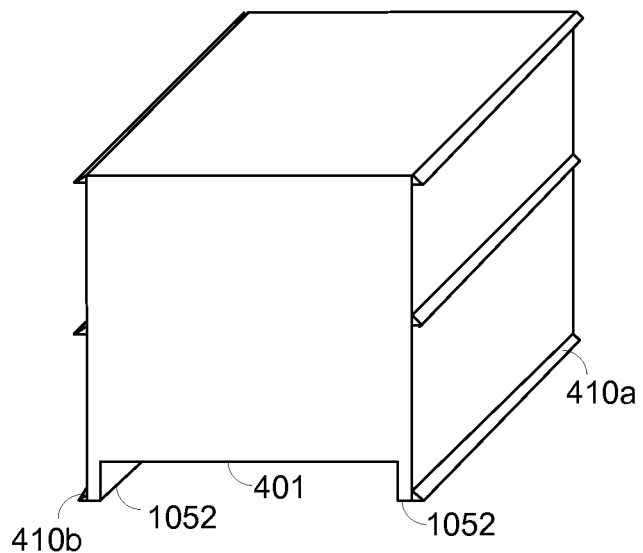
FIGS. 11A and 11B are drawings of examples of the mobile storage unit of FIG. 4 according to various embodiments of the present disclosure.

With reference to FIG. 11A, shown is an example of the mobile storage unit 400 of FIG. 4 according to various embodiments of the present disclosure. The non-limiting example of FIG. 11A depicts a mobile storage unit 400 that may be physically moved by a mobile drive unit such as, for example, a forklift, a pallet jack, and/or a robotic drive system. One example of such a robotic drive system is the KIVA® R drive unit. The KIVA® R drive unit is a low-lying mobile drive unit with a top mounted lifting plate that may be positioned under a load and raised to lift the load off the ground for transport.

According to various embodiments, the mobile storage unit 400 may include support members 1052 that elevate the base 401 off the ground surface. This provides an entry port for receiving a mobile drive unit or a portion of a mobile drive unit. The mobile drive unit or a portion thereof may be inserted into the entry port to lift and transport the mobile storage unit 400. The support members 1052 may make up structures that are adapted to separate the base 401 from the ground surface. For example, a support member 1052 may comprise a stand, a foot structure, or any other load-bearing structure. Bottom guiderails 410a,b may be attached to the support members 1052 to allow the mobile storage unit 500 to be moved by a mobile drive unit while also allowing the mobile storage unit 400 to be securely loaded onto a payload platform 100 (FIG. 1).

Figure 11B:
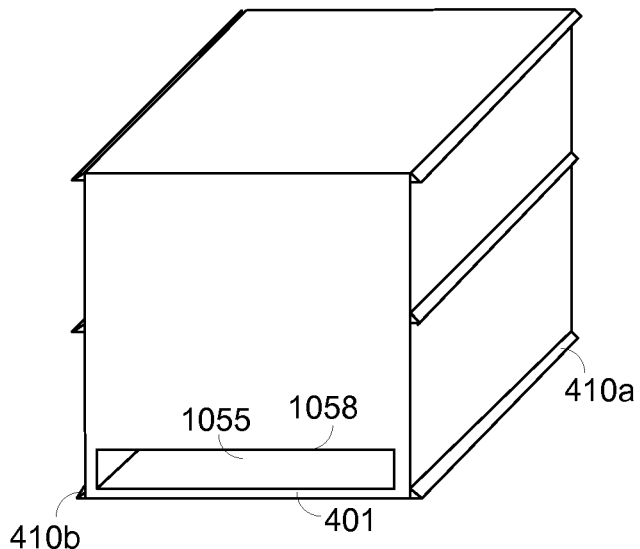

With reference to FIG. 11B, shown is an example of the mobile storage unit 400 of FIG. 4 according to various embodiments of the present disclosure. The non-limiting example of FIG. 11B depicts a mobile storage unit 400 that may be physically moved by a mobile drive unit. FIG. 11B depicts an alternative to FIG. 11A where an entry port 1055 is formed in the base 401 of the mobile storage unit 400. The entry port 1055 may be formed as an empty region of space that is adapted to receive a portion of a mobile drive unit such as a forklift. The surface 1058 above the entry port 1055 may form a portion of a structure that supports the items 511 (FIG. 5) stored in the mobile storage unit 400. The entry port 1055 may comprise a receptacle that allows a portion of a mobile drive unit to attach to the mobile storage unit 400. The mobile storage unit 400 may comprise an attachment mechanism such as, for example, a magnet, a clip, a latch, a fastener, or any other attachment mechanism, that allows the mobile storage unit 400 to attach to the mobile drive unit. Thus, the mobile drive unit may lift and/or attach to the mobile storage unit 400 to transport the mobile storage unit 400 throughout a materials handling facility.

Figure 12:
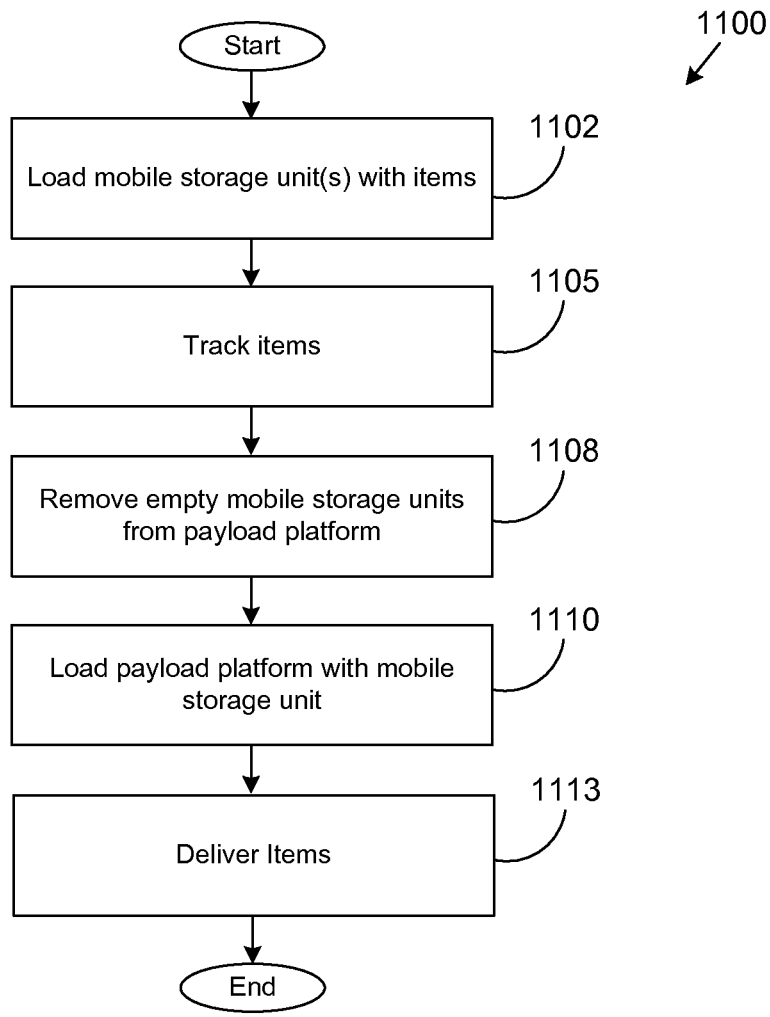
FIG. 12 is a drawing of a flowchart depicting a loading operation using the mobile storage unit of FIG. 4 according to various embodiments of the present disclosure.

With reference to FIG. 12, shown is a flowchart that represents an example of the operation of loading operation 1100 according to various embodiments of the present disclosure. It is understood that the flowchart of FIG. 12 provides merely an example among others of the operation of the loading operation 1100 as described herein. As an alternative, the flowchart of FIG. 12 may be viewed as depicting an example of steps of a method performed by the loading operation according to one or more embodiments.

Beginning at box 1102, the loading operation includes loading one or more mobile storage units 400 with items 511 (FIG. 5). Mobile storage units 400 may comprise wheels 613 (FIG. 6), 703 (FIG. 7), 812 (FIGS. 8A and 8B) to allow easy movement throughout a depot. The mobile storage units 400 may be loaded regardless of the location of the delivery vehicle that is scheduled to deliver the items 511.

At box 1105, the items 511 are tracked. When loading a particular mobile storage unit 400 at the depot the user may physically place the item 511 in the mobile storage unit 400. Additionally, the user may input data into a computing device of the mobile storage unit 400 to track the item 511. For example, the user may manipulate an input device 425 (FIG. 4) or transmit data to the mobile storage unit 400 via a client. As another example, the mobile storage unit 400 may comprise an RFID device to automatically track items 511 that are physically loaded into the mobile storage unit 400. The mobile storage unit may employ RFID tags to perform this tracking.

At box 1108, empty mobile storage units 400 are removed from the delivery vehicle. The delivery vehicle may arrive at any point in time before, during, or after the items 511 are loaded into the mobile storage units 400. The delivery vehicle may include a payload platform 100 (FIGS. 1-3) that are loaded with mobile storage units 400 from a previous delivery trip. These mobile storage units 400 from the previous trip may be empty such that there are no items remaining. Accordingly, these mobile storage units 400 may be removed from the payload platform 100 to make room for those mobile storage units 400 that are loaded with items 511.

At box 1110, the payload platform 100 is loaded with the mobile storage units 400 that include the items 511 that are scheduled for delivery. An example of the loading process is discussed above with respect to at least FIG. 9. At box 1113, the delivery vehicle delivers the items 511. Thereafter, the process ends.

Although the flowchart of FIG. 12 shows a specific order of execution, it is understood that the order of execution may differ from that which is depicted. For example, the order of execution of two or more boxes in FIG. 12 may be scrambled relative to the order shown. Also, two or more boxes shown in succession in FIG. 12 may be executed concurrently or with partial concurrence. Further, in some embodiments, one or more of the blocks shown in FIG. 12 may be skipped or omitted. It is understood that all such variations are within the scope of the present disclosure.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A mobile storage unit, comprising:
   a plurality of walls forming an interior region;
   a compartment within the interior region being configured to store a plurality of items for delivery;
   a doorway that provides access to the interior region, wherein a frame of the doorway extends along a first plane;
   a base supporting the plurality of walls; and
   a set of bottom guiderails coupled to the base, the set of bottom guiderails extending along a second plane; the set of bottom guiderails being configured to engage a corresponding set of receiving bottom guiderails, the corresponding set of receiving guiderails being coupled to a surface of a payload platform of a motorized vehicle.

2. The mobile storage unit of claim 1, wherein the first plane is perpendicular to the second plane.

3. The mobile storage unit of claim 1, further comprising a refrigeration system that controls a temperature of the interior region to refrigerate the plurality of items.

4. The mobile storage unit of claim 1, further comprising a display monitor mounted to an outer surface of the mobile storage unit, the display monitor being configured to display delivery route information.

5. The mobile storage unit of claim 1, further comprising a set of detachable wheels configured to move the mobile storage unit.

6. A system, comprising:
   a mobile storage unit being configured to store a plurality of items;
   a set of guiderails coupled to the mobile storage unit, the set of guiderails being configured to engage a corresponding set of receiving guiderails, the corresponding set of receiving guiderails being coupled to a payload platform of a motorized vehicle; and
   a refrigeration system that controls a temperature of an interior region of the mobile storage unit to refrigerate or freeze the plurality of items.

7. The system of claim 6, wherein the payload platform comprises a trailer and a trailer hitch, the trailer being attached to the motorized vehicle via the trailer hitch to facilitate a towing of the trailer by the motorized vehicle.

8. The system of claim 6, further comprising:
   a base;
   a plurality of walls attached to the base forming an interior region; and
   a side guiderail coupled to at least one wall among the plurality of walls, the side guiderail being configured to engage a receiving side guiderail, the receiving side guiderail being coupled to a frame of the payload platform.

9. The system of claim 6, further comprising a port that is configured to be coupled to a duct, the port being configured to receive cooled air from the refrigeration system via the duct.

10. The system of claim 6, further comprising a display monitor mounted to an outer surface of a wall of the mobile storage unit, the display monitor being configured to display the temperature of the interior region.

11. The system of claim 6, further comprising a computing device configured to obtain delivery route information from a client device.

12. The system of claim 6, wherein the payload platform comprises a plurality of sets of receiving guiderails to transport a plurality of mobile storage units.

13. The system of claim 6, further comprising a set of wheels attached to the mobile storage unit, the set of wheels being configured to be moved from a first position to a second position, wherein the set of wheels makes contact with a ground surface in the first position, wherein the set of wheels avoids contact with the ground surface in the second position.

14. The system of claim 6, wherein the mobile storage unit comprises a doorway formed within a wall of the mobile storage unit.

15. A mobile storage unit, comprising:
   a base;
   a plurality of walls attached to the base, the plurality of walls forming an interior region to store a plurality of items; and
   a locking device coupled to the base, the locking device being configured to engage a receiving locking device, the receiving locking device being coupled to a payload platform of a delivery vehicle, the payload platform being configured to transport a plurality of mobile storage units including the mobile storage unit.

16. The mobile storage unit of claim 15, further comprising a computing device configured to communicate item information to a client device, the item information relating to the plurality of items.

17. The mobile storage unit of claim 15, further comprising a computing device, the computing device comprising memory configured to store delivery route information.

18. The mobile storage unit of claim 15, further comprising a display monitor configured to display at least one of a temperature or delivery route information.

19. The mobile storage unit of claim 18, further comprising a refrigeration system that reduces the temperature of the interior region to a temperature that is below 45 degrees Fahrenheit.

20. The mobile storage unit of claim 15, further comprising a set of wheels configured to be moved from a first position to a second position, wherein the set of wheels makes contact with a ground surface in the first position, wherein the set of wheels avoids contact with the ground surface in the second position.

21. The mobile storage unit of claim 15, further comprising a port that is configured to be coupled to a duct, the port being configured to receive cooled air used to refrigerate the plurality of items.

22. The mobile storage unit of claim 15, further comprising a transmitter configured to transmit a unique identifier of the mobile storage unit to an external computing system.

23. The mobile storage unit of claim 15, further comprising a power inlet configured to receive a power supply voltage.

24. The mobile storage unit of claim 15, further comprising an entry port adapted to receive at least a portion of a mobile drive unit used to transport the mobile storage unit.

* * * * *